United States Patent
Liu (10) Patent No.: US 9,409,625 B2
(45) Date of Patent: Aug. 9, 2016

(54) SUPPORT ASSEMBLY FOR HUB FOR AN INTERNAL CLUTCH WITH AN EXTERNAL POWER INPUT MECHANISM

(71) Applicant: Jen-Chih Liu, Kaohsiung (TW)

(72) Inventor: Jen-Chih Liu, Kaohsiung (TW)

( * ) Notice: Subject to any disclaimer, the term of this patent is extended or adjusted under 35 U.S.C. 154(b) by 63 days.

(21) Appl. No.: 14/231,709

(22) Filed: Mar. 31, 2014

(65) Prior Publication Data

US 2015/0275988 A1  Oct. 1, 2015

(51) Int. Cl.
  *B62M 11/16* (2006.01)
  *B62M 11/14* (2006.01)
  *B62M 11/18* (2006.01)

(52) U.S. Cl.
  CPC ............... *B62M 11/14* (2013.01); *B62M 11/16* (2013.01); *B62M 11/18* (2013.01)

(58) Field of Classification Search
  CPC ......... B62M 11/16; F16D 21/00; F16H 51/00
  See application file for complete search history.

(56) References Cited

U.S. PATENT DOCUMENTS

| | | | | |
|---|---|---|---|---|
| 5,785,625 A * | 7/1998 | Matsuo et al. | | 475/297 |
| 5,855,530 A * | 1/1999 | Huang et al. | | 475/289 |
| 5,863,270 A * | 1/1999 | Chen et al. | | 475/289 |
| 5,964,678 A * | 10/1999 | Hanada et al. | | 475/297 |
| 6,383,111 B1 * | 5/2002 | Liu | | 475/276 |
| 7,708,297 B2 * | 5/2010 | Thorpe | | 280/281.1 |
| 8,241,160 B2 * | 8/2012 | Jung et al. | | 475/297 |
| 2001/0019982 A1 * | 9/2001 | Yoo | | 475/312 |
| 2012/0071290 A1 * | 3/2012 | Byun | | 475/288 |

* cited by examiner

*Primary Examiner* — Justin Holmes
*Assistant Examiner* — Lillian Nguyen (57) ABSTRACT

A support assembly of a hub of an internal clutch with an external power input mechanism comprises a hub rotatably supported by a first lateral cover a second lateral cover; the first lateral cover being fixedly retained to a fixing shaft; the first lateral cover being formed with at least one through hole for installing a driving device; therefore, an external power can be transferred into the first lateral cover by passing through the driving device to drive an internal clutch therein. The driving device includes active gears and passive gears; the active gear for transferring external power is installed out of the first lateral cover. The passive gear is installed within the first lateral cover and the hub. The passive gear is engaged to the internal clutch. The active gear out of the first lateral cover is engaged to the passive gear and passes through the through hole.

7 Claims, 7 Drawing Sheets

SUPPORT ASSEMBLY FOR HUB FOR AN INTERNAL CLUTCH WITH AN EXTERNAL POWER INPUT MECHANISM

FIELD OF THE INVENTION

The present invention relates to clutch assembling structures, and in particular to a support assembly of a hub of an internal clutch with an external power input mechanism.

BACKGROUND OF THE INVENTION

Current power transfer of bicycles has two different forms, one uses a chain for power transfer, and another is chainless. The trading power of a driver applied to a crank of a bicycle is transferred to the rear wheel by a chain or chainlessly so as to drive the bicycle to move.

Currently, clutches of bikes are hidden within hubs of the bikes and are only suitable to bikes with chains, while currently no internal clutch is provided for chainless bikes; and thus no suitable driving device for guiding power out of the hub to transfer into the hubs.

Figure 1:
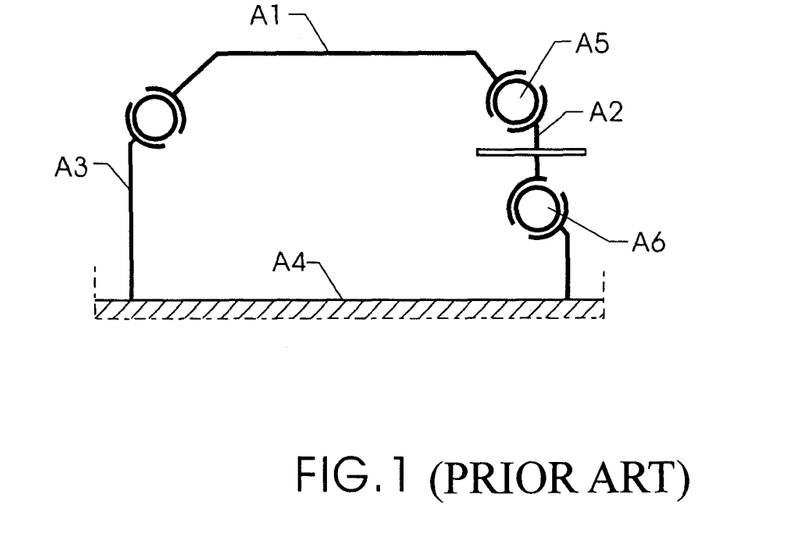
FIG. 1 is a schematic view showing a conventional supporting structure of a hub of a conventional internal clutch.

With reference to FIG. 1, conventionally, the supporting structure of the hub A1 of the internal clutch is supported by the lateral covers A2 and A3 to be installed on a fixing shaft A4. The bearings A5 are installed between the hub A1 and the lateral covers A2 and A3. A bearing A6 is installed on a position between the lateral cover A2 and the fixing shaft A4 so that the lateral cover A2 is freely rotatable. The rotatable lateral cover A2 thus serves to transfer power out of the lateral cover into the cover to drive the internal clutch to rotate. In this conventional structure, the bearing 6 is used for rotation of the lateral cover A2. However, this structure causes that the supporting structure needs higher precision and more complicated design for achieving the requirement of stability and power transfer. As a result, the structure is complicated and the cost is high. Furthermore, the overall manufacturing works are more and more complicated and cost in assembling is thus increased.

Therefore, there is an eager demand for an internal clutch installed within the hub for using to a chainless bike, in that it has a compact and simple structure for power inputting to the hub for driving the internal clutch.

SUMMARY OF THE INVENTION

To improve above mentioned object, the present invention provides a support assembly of a hub of an internal clutch with an external power input mechanism, which is suitable for a chainless bike, in that, the structure of the present invention is simple, compact and practical; moreover, the assembly of the present invention is simple and cost thereof is low.

To achieve above object, the present invention provides a support assembly of a hub of an internal clutch with an external power input mechanism comprising a hub rotatably supported by a first lateral cover a second lateral cover which are combined by using bearings installed therebetween; the first lateral cover being fixedly retained to a fixing shaft; the first lateral cover being formed with at least one through hole for installing a driving device; therefore, an external power can be transferred into the first lateral cover by passing through the driving device so as to drive a internal clutch therein. The driving device includes active gears and passive gears; the active gear for transferring external power is installed out of the first lateral cover. The passive gear is installed within the first lateral cover and the hub. The passive gear is engaged to the internal clutch. The active gear out of the first lateral cover is directly engaged to the passive gear and passes through the through hole.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Figure 2:
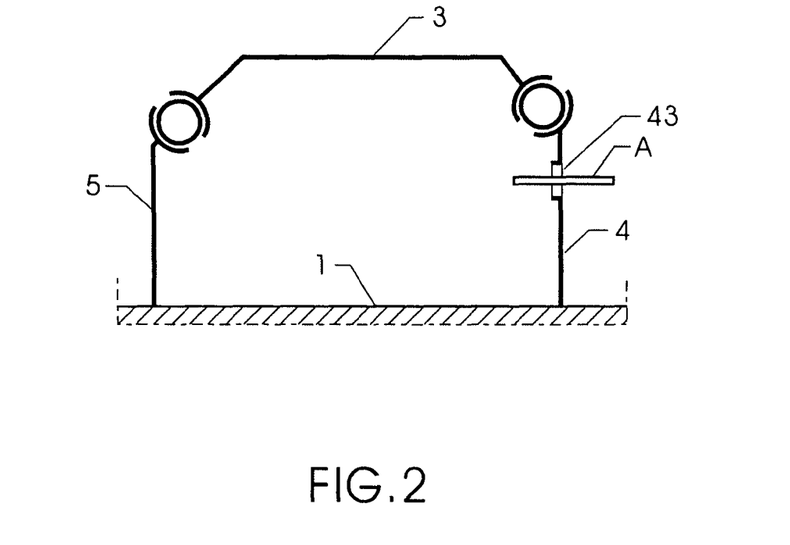
FIG. 2 is a schematic view showing the supporting assembly for a hub of an internal clutch of a bike.

With reference to FIG. 2, the main feature of the present invention is illustrated. As illustrated in the drawing, a hub structure for an internal clutch of the present invention includes the following elements.

A hub 3 is rotatably supported by a first lateral cover 4 and a second lateral cover 5 by using bearings installed bearings therebetween. The first lateral cover 4 is fixedly retained to a fixing shaft 1. The first lateral cover 4 is formed with at least one through hole 43 for installing a driving device A. Therefore, an external power can be transferred into the first lateral cover 4 by passing through the driving device A so as to drive an internal clutch 2 therein.

With reference to FIGS. 3 and 4 and FIGS. 11 and 12, in these embodiments, the first lateral cover 4 is fixed or attached to the fixing shaft 1 un-rotationally. The first lateral cover 4 is formed with a through hole 43 for receiving a driving device A.

Figure 3:
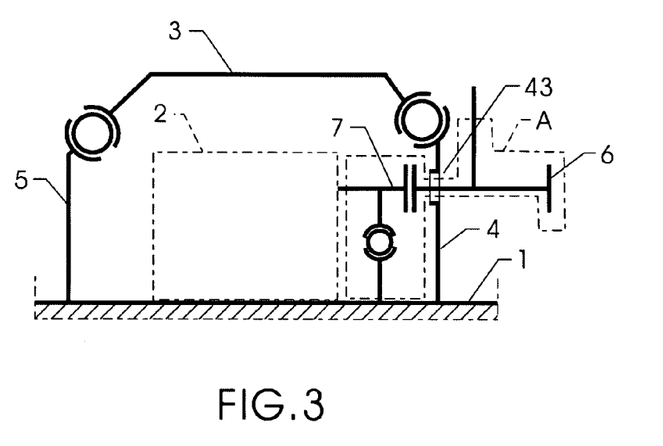
FIG. 3 is a schematic view showing the first embodiment of the present invention.
Figure 4:
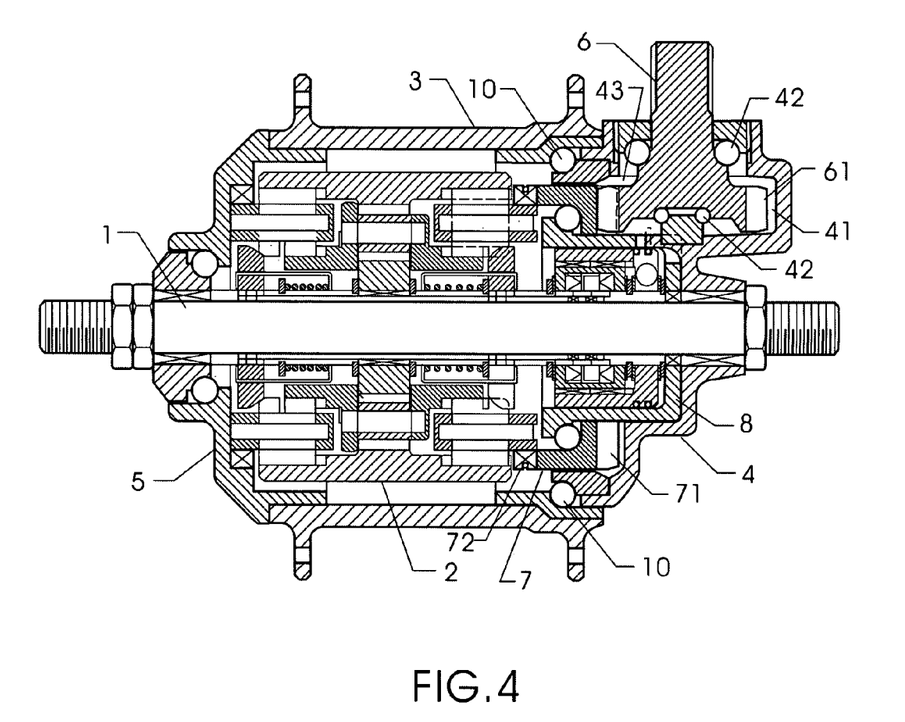
FIG. 4 is a cross sectional view about the first embodiment of the present invention, which is suitable for chainless bikes.

In FIGS. 3 and 4, the first embodiment according to the present invention is illustrated. The hub 3 for an internal clutch of the present invention is rotatably supported by a first lateral cover 4 and a second lateral cover 5 by using bearings installed therebetween. The first lateral cover 4 is fixedly retained to a fixing shaft 1. The first lateral cover 4 is formed with at least one through hole 43 for installing a driving device A. Therefore, an external power can be transferred into the first lateral cover 4 by the driving device A so as to drive an internal clutch 2 therein. In that the driving device A is assembled by using umbrella gear sets, surface gear sets, ratchet gear sets, spiral gear sets, etc. As illustrated in the drawings, the driving device A includes active gears 6 and passive gears 7. The active gear 6 for transferring external power is installed out of the first lateral cover 4. The passive gear 7 is installed within the first lateral cover 4 and the hub 3. The passive gear 7 is engaged to the internal clutch 2. The active gear 6 out of the first lateral cover 4 is directly engaged to the passive gear 7 and passes through the through hole 43. This structure is suitable to a hub supporting assembly for an internal clutch 2 of a chainless bike.

With reference to FIGS. 4 to 8, the first lateral cover 4 as an external power input is un-rotatably fixed to the fixing shaft 1. The passive gear 6 is assembled to a base 41 by using a bearing 42 installed therebetween. The active gear 6 passes through the through hole 43 of the first lateral cover 4 to the internal of the first lateral cover 4 and is engaged to the passive gear 7 between the first lateral cover 4 and the internal clutch 2.

Figure 5:
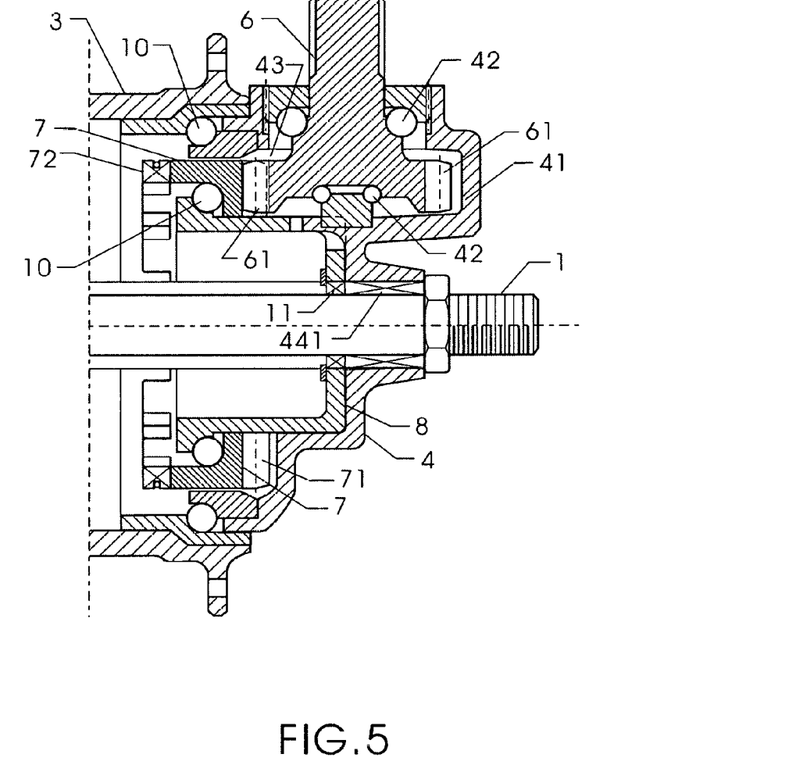
FIG. 5 is a cross sectional view about the lateral covers, active gear and passive gear in the first embodiment of the present invention.
Figure 6:
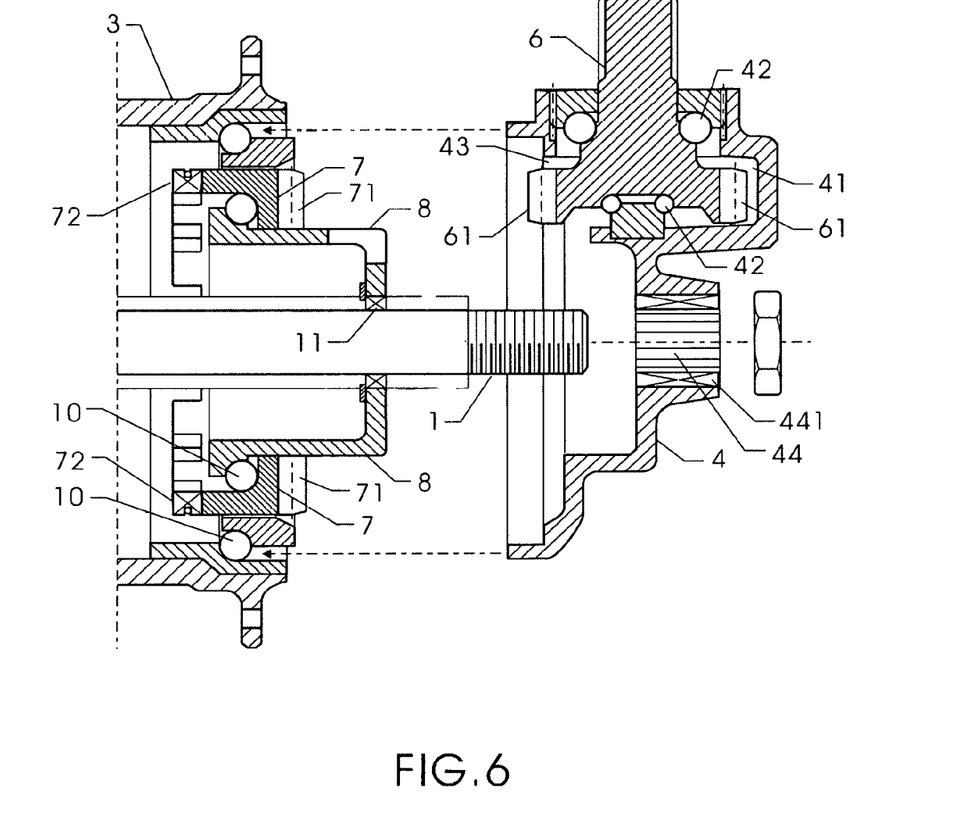
FIG. 6 is an assembled view of the structure shown in FIG. 5.
Figure 7:
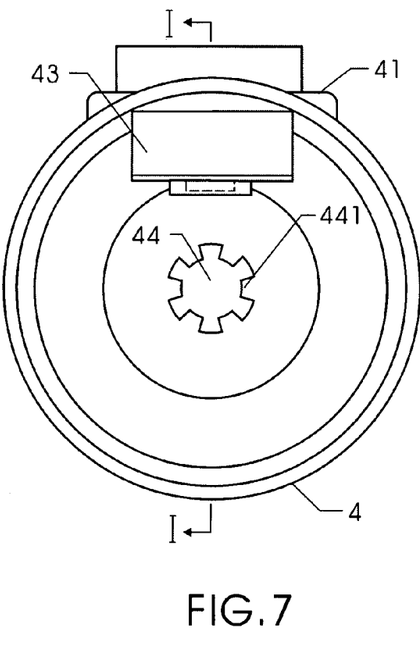
FIG. 7 shows the lateral cover f the first embodiment of the present invention.
Figure 8:
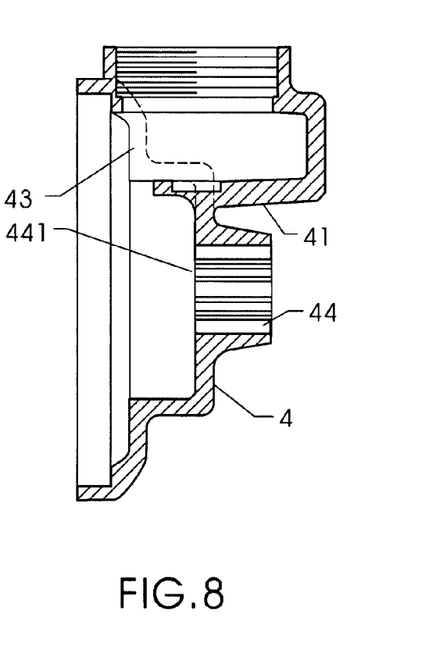
FIG. 8 is a cross sectional view along line I-I of FIG. 7.
Figure 9:
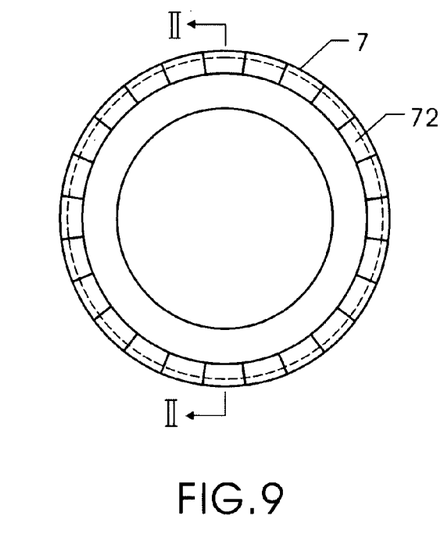
FIG. 9 is an embodiment about the passive gear of the first embodiment of the present invention.
Figure 10:
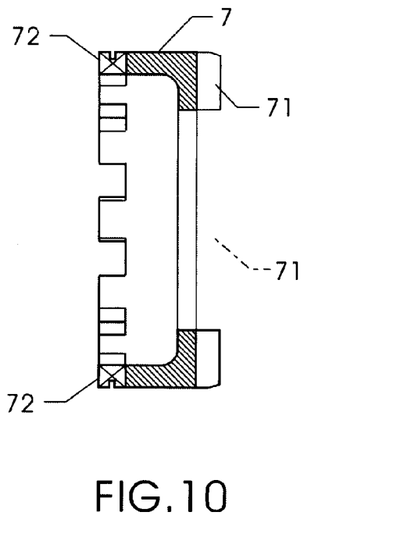
FIG. 10 is a cross sectional view along line II-II of FIG. 9.

With reference to FIGS. 9 and 10, the passive gear 7 installed in the first lateral cover 4 is a ring gear. One side of passive gear 7 has teeth 71 for engaging the teeth 61 of the active gear 6 and another side thereof has teeth 72 for engaging to the internal clutch 2. As illustrated in FIGS. 5 and 6, in assembling the passive gear 7, the passive gear 7 is supported by the base 8 assembled to the fixing shaft 1 by using a bearing 10. The passive gear 7 is installed in an internal space of the internal clutch 2 after the first lateral cover 4 is sealed as illustrated in FIG. 4. The internal clutch 2 is installed in the hub 3. The passive gear 7 is engaged to the active gear 6 out of the first lateral cover 4 and is installed between the first lateral cover 4 and the internal clutch 2.

The first lateral cover 4 is fixed to the fixing shaft 1 un-rotatably. The first lateral cover 4 is formed with an axle hole 44. A plurality of buckling strips 441 are installed within the axle hole 44 for retaining the fixing shaft 1 and a part of the fixing shaft 1 is fixed to a buckling groove 11 as that the first lateral cover 4 is un-rotatably fixed to the fixing shaft 1.

Figure 11:
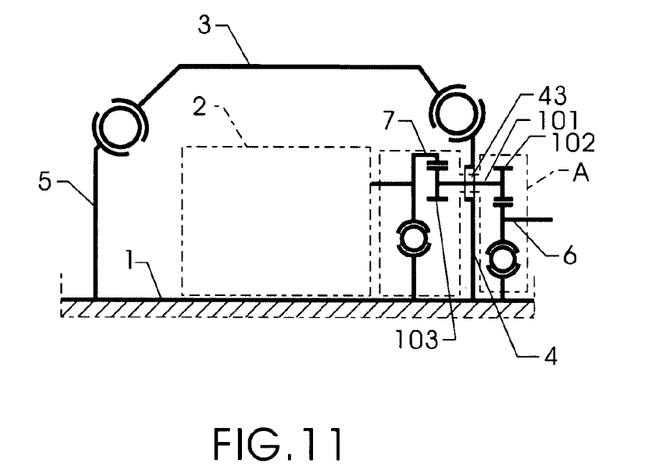
FIG. 11 is a schematic view showing the second embodiment of the present invention.
Figure 12:
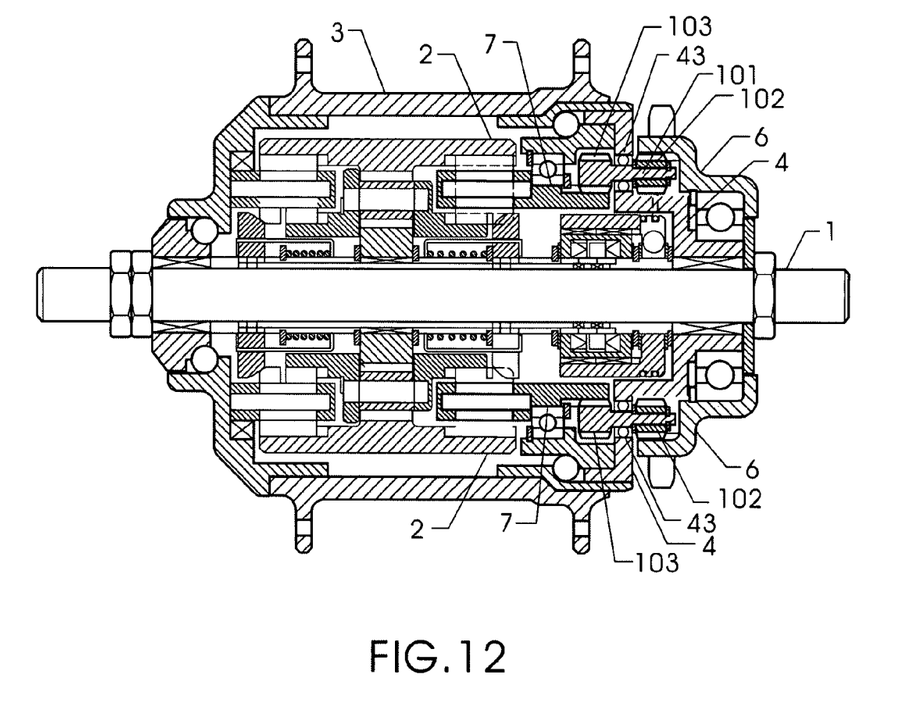
FIG. 12 is a cross sectional view about the second embodiment of the present invention, which is suitable for chainless bikes.
Figure 13:
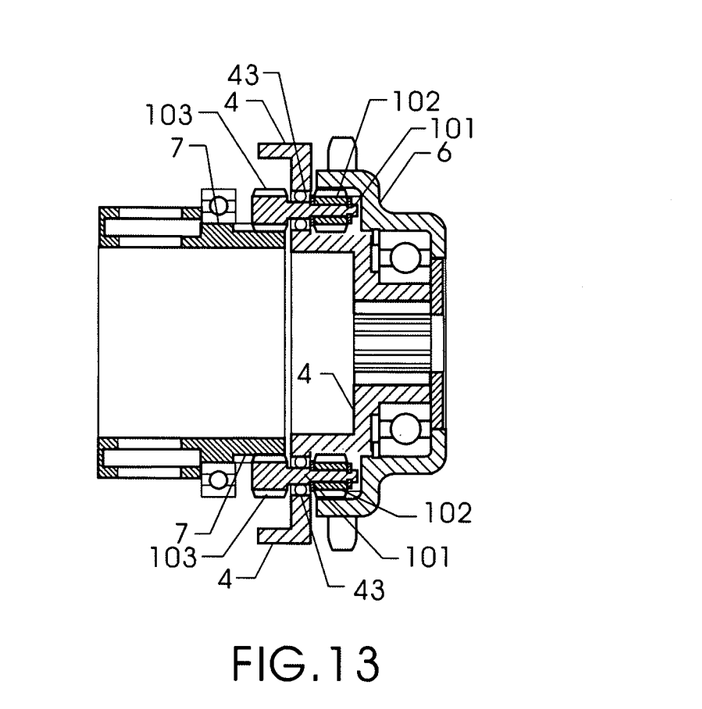
FIG. 13 is a cross sectional view showing the lateral covers, active gear, driven gear set and the passive gear of the present invention.
Figure 14:
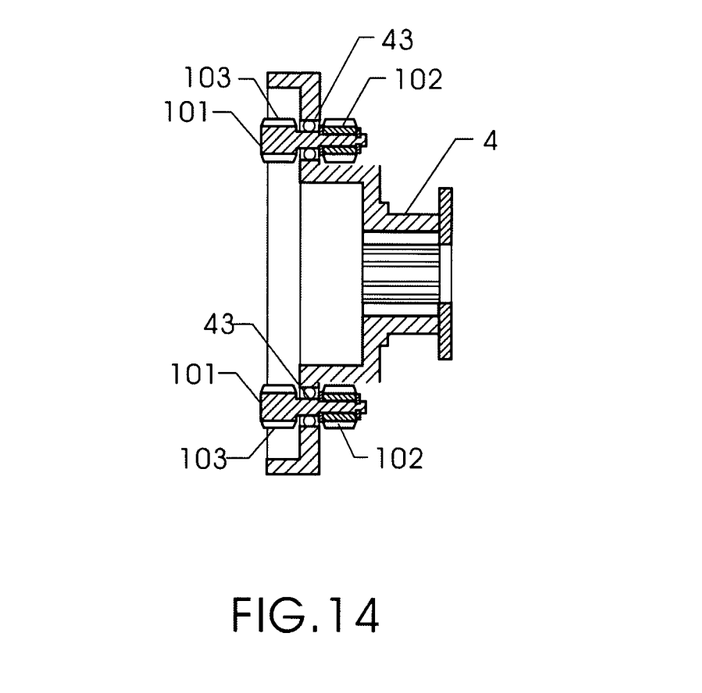
FIG. 14 is a cross sectional view about the lateral cover and driven gear set of the second embodiment of the present invention.

With reference to FIGS. 11 and 12, the second embodiment of the present invention is illustrated. The hub 3 of the internal clutch 2 is rotatably supported on the first lateral cover 4 and the second lateral cover 5. The first lateral cover 4 and the second lateral cover 5 are fixedly assembled to the fixing shaft 1. The first lateral cover 4 is un-rotatably installed to the fixing shaft 1. The first lateral cover 4 is formed with at least one through hole 43 for being passed by a driving device A. The through hole 43 is passed through by a driving device A so that external power can be transferred into first lateral cover 4 through the driving device A and thus is transferred to the internal clutch 2 for driving the internal clutch 2 to operate. In that the driving device A is assembled by using umbrella gear sets, surface gear sets, ratchet gear sets, spiral gear sets, etc. and by various gears, and the axles of the input side and output side of the driving device A are parallel or are coaxial so that the power out of the first lateral cover 4 is transferred to the internal clutch 2 within the first lateral cover 4. The passive gear 7 is installed within the internal clutch 2 which is installed with the first lateral cover 4 and the hub 3. The passive gear 7 is engaged to the internal clutch 2. The passive gear 7 is installed to a rotation shaft 101 of a driven gear which is installed on the through hole 43 of the first lateral cover 4. Two ends of the rotation shaft 101 are formed with a first gear 102 and a second gear 103. The first gear 102 out of the through hole 43 of the first lateral cover 4 is engaged to an active gear 6. The second gear 103 within through hole 43 of the first lateral cover 4 is engaged to the passive gear 7. This embodiment is suitable for the internal clutch hub supporting structure of the power input of the driving device of a chainless bike.

Advantages of the present invention are that the structure of the present invention is simple, compact and practical; moreover, the assembly of the present invention is simple and cost thereof is low.

The present invention is thus described, it will be obvious that the same may be varied in many ways. Such variations are not to be regarded a departure from the spirit and scope of the present invention, and all such modifications as would be obvious to one skilled in the art are intended to be included within the scope of the following claims.

What is claimed is:

1. A support assembly of a hub of an internal clutch with an external power input mechanism, comprising:
   a hub rotatably supported by a first lateral cover a second lateral cover which are combined by using bearings installed therebetween; the first lateral cover being fixedly retained to a fixing shaft; the first lateral cover being formed with at least one through hole for installing a driving device; therefore, external power can be transferred into the first lateral cover by passing through the driving device so as to drive an internal clutch therein; and
   wherein the driving device includes active gears and passive gears; the active gear for transferring external power is installed out of the first lateral cover; the passive gear is installed within the first lateral cover and the hub; the passive gear is engaged to the internal clutch; the active gear out of the first lateral cover is directly engaged to the passive gear and passes through the through hole; and
   wherein the passive gear installed in the first lateral cover is a ring gear; one side of passive gear has teeth for engaging the teeth of the active gear and another side thereof has teeth for engaging to the internal clutch.

2. The support assembly of a hub of an internal clutch with an external power input mechanism as claimed in claim 1, wherein the first lateral cover is formed with an axle hole; a plurality of buckling strips are installed within the axle hole for retaining the fixing shaft and a part of the fixing shaft is fixed to a buckling groove so that the first lateral cover is un-rotatably fixed to the fixing shaft.

3. The support assembly of a huh of an internal clutch with an external power input mechanism as claimed in claim 1, wherein the driving device is assembled by using at least one of umbrella gear sets, surface gear sets, ratchet gear sets, spiral gear sets or the combination thereof.

4. The support assembly of a hub of an internal clutch with an external power input mechanism as claimed in claim 1, wherein the driving device is assembled by using umbrella gear sets, surface gear sets, ratchet gear sets, spiral gear sets, and by various gears.

5. The support assembly of a hub of an internal clutch with an external power input mechanism as claimed in claim 1, wherein the first lateral cover for inputting an external power input is un-rotatably fixed to the fixing shaft; the passive gear is assembled to a base by using a bearing installed therebetween; the active gear passes through the through hole of the first lateral cover to the internal of the first lateral cover and is engaged to the passive gear between the first lateral cover and the internal clutch.

6. The support assembly of a hub of an internal clutch with an external power input mechanism as claimed in claim 1, wherein the supporting structure of the hub of the internal clutch is supported by the lateral covers to be installed on a fixing shaft; bearings are installed between the hub and the lateral covers; another bearing is installed between the lateral cover and the fixing shaft so that the lateral cover is freely rotatable.

7. A support assembly of a hub of an internal clutch with an external power input mechanism, comprising:

a hub rotatably supported by a first lateral cover a second lateral cover which are combined by using bearings installed therebetween; the first lateral cover being fixedly retained to a fixing shaft; the first lateral cover being formed with at least one through hole for installing a driving device; therefore, external power can be transferred into the first lateral cover by passing through the driving device so as to drive an internal clutch therein; and the driving device includes an active gear, a passive gear and a driven gear set which is installed in the through hole of the first lateral cover; the passive gear is installed within the internal clutch which is installed with the first lateral cover and the hub; the passive gear is engaged to the internal clutch; the passive gear is engaged to a rotation shaft of the driven gear installed on the through hole of the first lateral cover; two ends of the rotation shaft are formed with a first gear and a second gear; the first gear out of the through hole of the first lateral cover is engaged to an active gear; and the second gear within through hole of the first lateral cover is engaged to the passive gear.

* * * * *